UNITED STATES PATENT OFFICE.

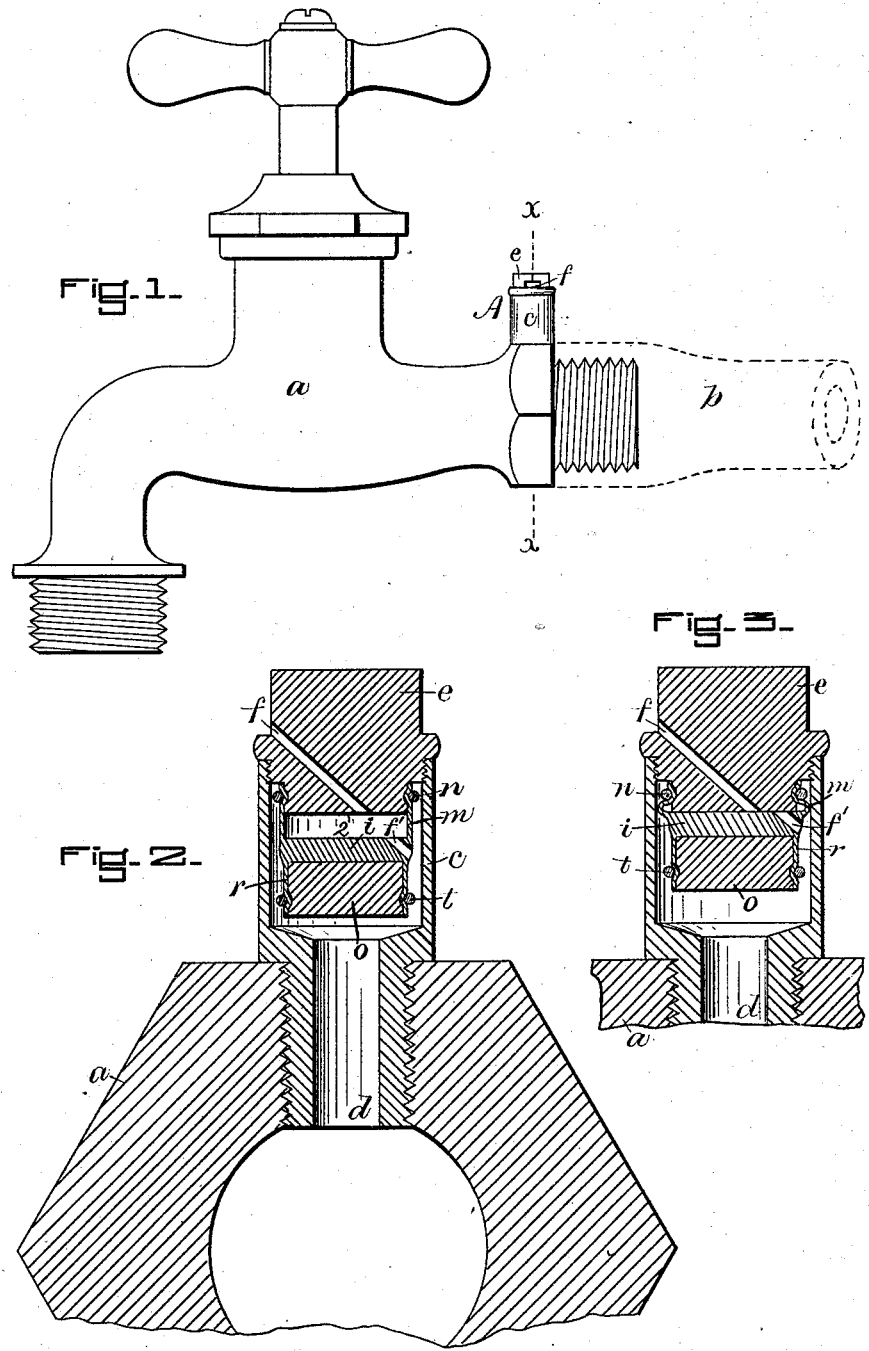

JOSEPH D. WESTGATE, OF MANCHESTER, NEW HAMPSHIRE, ASSIGNOR OF ONE-HALF TO WILLIAM H. HODGDON, OF LYNN, MASSACHUSETTS.

AUTOMATIC VENT FOR WATER-PIPES.

SPECIFICATION forming part of Letters Patent No. 290,824, dated December 25, 1883.

Application filed February 13, 1883. (No model.)

*To all whom it may concern:*

Be it known that I, JOSEPH D. WESTGATE, of Manchester, county of Hillsborough, State of New Hampshire, have invented an Improvement in Automatic Vents for Water-Pipes, of which the following description, in connection with the accompanying drawings, is a specification, like letters on the drawings representing like parts.

My invention has for its object to provide means for admitting air to the water delivery or distributing pipes of houses or buildings when the supply of water from the main is cut off from the said delivery or house pipes by a stop-cock at the end of the service-pipe from the street-main, to prevent freezing in cold weather. Stop-cocks for turning off water from house-pipes are usually made as three-way cocks, they being provided with an outlet passage from the delivery-pipes beyond the said cocks, which passage is opened when the stop-cock is closed to prevent the water from entering the delivery-pipes from the water-main, the said outlet-passage being intended to permit the water that is standing in the said delivery-pipes to escape when the stop-cock is closed, so that it will not freeze, and, by its expansion, burst the pipes or interrupt the flow of water when the stop-cock is again opened. The water will, however, in spite of the said outlet-passage be retained in the said pipes by the atmospheric pressure unless a vent is provided—as, for instance, by opening the usual faucets or outlets from the pipes to permit the air to enter above the water in the pipes—and, as the delivery-pipe of a building usually has several branches of greater or less length, it is generally necessary to open the faucets at the ends of all the said branches which are exposed to the danger of freezing. This is frequently neglected, especially in the case of tenement-houses where two or more different families draw water from the same service-pipe, as one party may turn off the water without the other being aware of it, and, on the other hand, if the water has been properly turned off and the faucets all opened to afford a vent for the pipes or permit the air to enter and the water to escape, it sometimes happens that some of the faucets will be left open when the water is subsequently turned on, and the water is thus permitted to run to waste or to overflow and cause damage.

My invention is embodied in an automatic vent or valve, operating to admit air to the delivery-pipes when the internal pressure is removed by shutting off the water or closing the stop-cock, the said vent being automatically closed when the pressure in the pipes is greater than the external or atmospheric pressure, as when the water is subsequently turned on from the street-main. The said vent contains a passage controlled by a check-valve opening inwardly toward the pipes, and the vent is preferably connected with the faucet, so that each branch of the pipe is emptied of water to its extreme end.

The invention consists in a novel construction of the check-valve, whereby it is especially adapted for this use, it being protected from collection of sediment, which is liable to clog valves such as heretofore employed for this purpose, and thus interfere with or wholly prevent their operation.

Figure 1 is a side elevation of a faucet provided with an automatic vent embodying this invention; Fig. 2, a transverse section thereof on line $x\,x$, Fig. 1, on a larger scale, showing the vent with its valve open for the admission of air; and Fig. 3 a similar section showing the valve as closed.

The faucet $a$, of any usual construction, forming the terminal of the branch of the delivery-pipe $b$, a portion of which is shown in dotted lines, is provided with the automatic vent A, (best shown in Figs. 2 and 3,) consisting of a valve-chamber, $c$, screwed into the inlet end of the faucet, and communicating by the passage $d$ with the interior of the delivery-pipe $b$. The said valve-chamber is closed at its upper end by a cap or plug, $e$, having an inlet-passage, $f$, for the admission of air, the under side of the said plug $e$ forming a valve-seat, as shown at 2.

The valve $i$ consists of a disk, preferably of yielding material—as, for instance, vulcanized rubber—connected by a flexible collapsible neck, $m$, with the lower portion of the plug $e$, it being shown as fastened thereto by a wire, $n$. The valve $i$ is preferably provided with a weight, $o$, (shown as a piece of metal connected with its under side) it being fastened in a tubular extension, $r$, of the said valve by a wire, $t$. The valve $i$ is provided with a passage, $f'$, which, when it is removed from its seat, permits the air entering through the passage $f$ to pass into the interior of the valve-chamber $c$, and thence through the passage $d$ into the service-pipe, thus allowing the water to escape therefrom when the stop-cock at the end of the service-pipe at the lower level is closed to shut off the water from the delivery-pipes of the building. As soon, however, as the said stop-cock is again opened, the water, entering the delivery-pipe, produces a pressure therein, which, acting upon the valve $i$, raises it to its seat, as shown in Fig. 3, thus closing the passage $f$ and preventing the escape of water from the pipes. The valve will usually be thus closed by the air flowing out in advance of the water, and by the herein-described construction the valve-seat 2 is inclosed and perfectly protected from the deposit of sediment, and is always kept clean and in working condition.

It is not essential that the vent should be applied to the faucets, although it is generally convenient to thus apply it, since the faucets are usually located at the ends of the branches of the pipes; or, in other words, at the proper points to admit the air, so as to cause the pipe to be completely emptied of water.

I claim—

1. An automatic vent for water-delivery pipes, consisting of a case having a valve-seat and passage connecting the interior of the delivery-pipe with the external atmosphere, and a valve controlling the said passage, combined with a collapsible tubular neck inclosing the valve-seat and co-operating portion of the valve, substantially as and for the purpose set forth.

2. The valve casing and plug closing its end, provided with an inlet-passage and valve-seat, combined with the valve of yielding material having a flexible collapsible neck connected with the said plug, substantially as and for the purpose described.

In testimony whereof I have signed my name to this specification in the presence of two subscribing witnesses.

JOSEPH D. WESTGATE.

Witnesses:
W. H. SIGSTON,
G. W. GREGORY.